D. O'HARA.

WATCH CASE.

No. 10,605.

Reissued June 2, 1885.

Witnesses

Wm. F. Bullmo.

H. P. Fellows

Daniel O'Hara

Inventor per

Brown Bros.

Attorneys.

N. PETERS, Photo-Lithographer, Washington, D. C.

UNITED STATES PATENT OFFICE.

DANIEL O'HARA, OF WALTHAM, MASSACHUSETTS.

WATCH-CASE.

SPECIFICATION forming part of Reissued Letters Patent No. 10,605, dated June 2, 1885.

Original No. 309,158, dated December 9, 1884. Application for reissue filed March 13, 1885.

*To all whom it may concern:*

Be it known that I, DANIEL O'HARA, of Waltham, in the county of Middlesex and State of Massachusetts, have invented certain new and useful Improvements in Watch-Cases, of which the following is a full, clear, and exact description.

This invention, in substance, consists, first, in a watch-case, of a riser or risers adapted for the attachment thereto of other parts of the case—such as the front or back cap or plate or bezel-ring and its crystal—and made independent of or separate from all other parts of and attached to the case; second, in a watch-case, of a riser or risers adapted for the attachment thereto of other parts of the case—such as the front or back cap or plate or bezel-ring and its crystal—and constructed to project from and overlap the sides of the central shell; third, in a watch-case, of a riser or risers adapted for the attachment thereto of other parts of the case—such as the front or back cap or plate or bezel-ring and its crystal—substantially as above described, in combination with devices adapted to connect the parts together and to prevent their rotation.

The figures of the accompanying plate of drawings, forming a part of this specification, illustrate the present invention, and they are all on a similarly enlarged scale.

Figure 1:
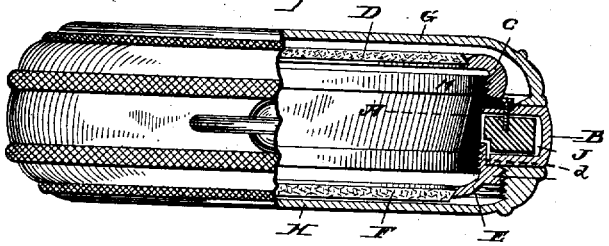

Figure 1 is in part a central transverse section, and in part an edge view, of a watch-case with the movement removed. Figs. 2 to 13, both inclusive, are sectional views at one side only of a watch-case, and they are all in illustration of the construction of the movement ring or band and its attachment to the annulus or central shell or body in accordance with this invention; and Fig. 14 is a similar view to Fig. 1, illustrating detail changes of construction of the movement ring or band, without departing, however, from the principles of this invention.

In the drawings, A is the band or movement-ring to contain the watch-movement. B is the central shell or annulus or body. C is the front bezel-ring, and D its crystal. E is the back bezel-ring, and F its crystal. G is the front cap or plate. H is the back cap or plate.

The movement band or ring A interiorly is adapted in any of the usual ways or in any other suitable way for receiving and securing the watch-movement. (Not represented in the drawings.) This ring A exteriorly is surrounded by the annulus or central shell, B, preferably made with a recess or chamber, J; but it may be made solid, or nearly so, using a baser metal for the inner portion thereof and for its exposed sides or surfaces silver, gold, or other suitable metal or material.

Figure 14:
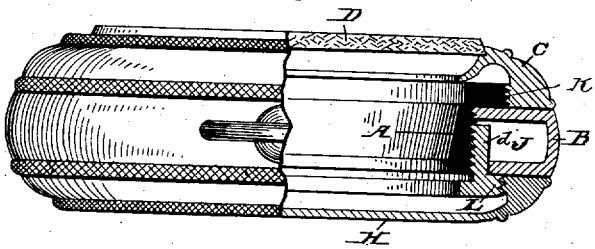

The annulus and movement-ring B A may be made either of the same or of different kinds of metal or other material, and they are made separate and distinct from each other, the watch-case being provided with a riser, K and L, at the front and back sides of the annulus B for the attachment at the front side of the front bezel-ring, C, and at the back side of a back bezel-ring, E, Fig. 1, or of a back cap or plate, H, Fig. 14.

Figure 8:
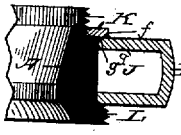
Figure 10:
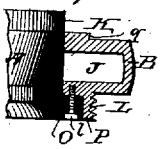
Figure 12:
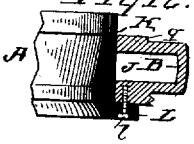
Figure 13:
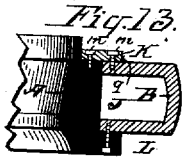

The front riser, K, Figs. 8, 10, and 12, is shown as made of and in one piece with the movement-ring, and in Fig. 13 it is shown as separate from the movement-ring and annulus and attached to both by set-screws *m*, which pass through it and are entered one into the annulus and the other into the movement-ring, and this separate riser K, as it is shown, overlaps a shoulder of the movement-ring and the side of the annulus.

The back riser, L, Figs. 8, 10, 11, and 12, is shown as of the movement-ring combined with a construction of the annulus to make or complete its working-edge for the attachment of the other parts, such as the front or back cap or cover or bezel-ring with its crystal. The back riser, L, Fig. 13, is wholly of the movement-ring, and the riser L, Figs. 8, 10, 11, 12, and 13, and the annulus are all shown as fastened together by a set-screw, *l*, which is entered into the risers and annulus.

Figure 2:
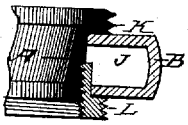
Figure 7:
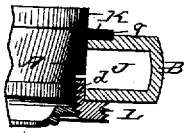

In Fig. 1 the riser at the front of the annulus, as shown, is of the ring itself, and the riser at the back of the annulus is made separate from and independent of all the other parts of the case, and as there shown it is screwed upon the outside of the ring, passing by its flange portion *d* into the chamber of the annulus, and the same construction in substance is shown in Figs. 2, 7, and 14.

Figure 3:
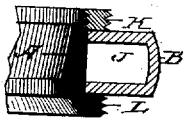

In Fig. 3 the riser at the front of the annulus is shown as made separate from and independent of the other parts of the case, and it is attached to the ring by screwing it upon its outside, and the riser L at the back of the annulus is made of the movement-ring.

Figure 4:
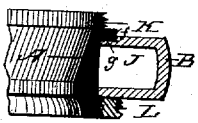

In Fig. 4 the riser at the back of the annulus is shown as made separate from and independent of all the other parts of the case and attached to the ring by screwing it upon its outside, and the riser at the front of the annulus is made of the ring itself, and flanged, as at *f*, to lap over and upon the front face or side *g* of the annulus.

Figure 5:
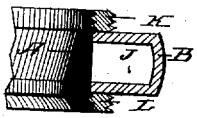

In Fig. 5 both risers are shown as made separate from and independent of the other parts of the case, and each attached to the ring by screwing it upon the outside thereof.

Figure 6:
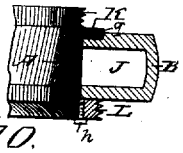

In Fig. 6 the construction and attachment of the risers shown are the same as shown in Fig. 4, and which has been described, with this exception, that the attached back riser, L, is further secured by a fastening screw or rivet, *h*, entered into it and the ring.

In Fig. 8 is shown at the front side of the shell a ring, *f*, which screws upon the projection of the movement-ring, and this ring rests against the front side or face, *g*, of the annulus B, and the construction of parts differs in that respect from the construction and arrangement of the risers shown in Fig. 12, and also in Fig. 13, and also in the further respect from the construction and arrangement of risers shown in Fig. 12, in that the back riser, L, is fastened to the annulus by a screw or rivet, *l*, passing through it into said annulus, and from the construction and arrangement of the risers shown in Fig. 13, in that both risers are fastened to the annulus by screws or rivets *m m*, passing through them and into the annulus.

Figure 9:
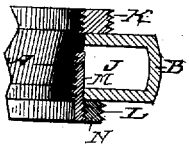

In Fig. 9, as shown, the front riser, K, is made separate from and screwed upon the ring A and the back riser in two parts, M N, one of which is screwed upon the outside of the ring A, entering into the chamber J of the annulus B, and the other, N, screwed upon the outside of the said part M, so screwed upon the ring A, and this construction differs from that shown in Fig. 14 in these respects, that in Fig. 14 the riser K at the front is shown as in one piece with the ring instead of a separate piece therefrom, as shown in Fig. 9, and the riser L at the back, while it is made separate from the ring, is in one piece in lieu of two pieces, as shown in Fig. 9, and resembling in the latter respect the back riser and its attachment shown in Fig. 7.

Figure 11:
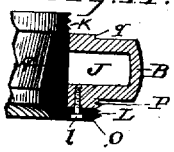

In Figs. 10 and 11 the front riser is shown as in one piece with ring A, and the back riser is in part O made of the ring, and in part P made of the annulus, Fig. 10 showing the back riser in its part O, made from the ring A, wholly surrounded by the part P thereof, made from the annulus, and Fig. 11 showing the back riser in its part O, made from the ring, and its part P, made from the annulus, in continuation of each other at the exterior periphery of the riser. In both views, Figs. 10 and 11, a fastening screw or rivet, *l*, is shown as entered into and through the back riser and the annulus.

In all of the constructions of the case with independent risers herein particularly described either one or both of the risers lap over and set against the surface of the central shell or annulus at the side of the annulus at which they are located, and in Fig. 13 the riser at the front of the case is shown made separate and independent of all the other parts of the case, and as attached by screw *m* to the annulus, and also as attached by another screw *m* to the movement-ring, all as before explained. With either of the attaching-screws *m* the independent riser, plainly, is secured in place, and, taken in connection with the constructions and attachments of all the other parts substantially as has been described, the several parts of the case are held together and secured against separation or detachment.

Again, it appears in all the figures except Figs. 10, 11, and 12 that the movement-ring is secured to the annulus and the annulus to the ring by and between the overlap of the risers at the front and back of the central shell. In Figs. 10, 11, 12, and 13 the riser at one side of the movement-ring, and in one piece therewith, is fastened to the annulus by a screw, *l*, which passes through the riser and into the annulus.

Screws may be used for the risers which, as in Fig. 1, lap over and against the sides of the annulus.

In case both risers of the case do not lap over and against the corresponding side of the annulus, then the ring and annulus should be fastened together in some manner—as, for instance, by fastening screws or rivets, as shown in Figs. 10, 11, 12, and 13—and such fastening means may be also used even when both risers lap over and against the sides of the annulus as shown in Fig. 1.

In Figs. 1 and 14 the riser at the back of the annulus has the back plate or cap screwed to it, and the part of the ring making such riser, and which is screwed upon the movement-ring itself, in Fig. 1, is shown as a bezel-ring to receive the back crystal, F.

Again, the front riser receives the front bezel-ring, C, and in addition, in Fig. 1, the case at its front is shown as provided with a front cap or plate, G, to be hinged to the annulus at such side, and provided with an opening-spring (not shown) located in the recess or chamber J of the annulus, all as well known.

The annulus and ring construction shown, Figs. 4, 6, 7, 8, 10, 11, 12, and 13, more especially referring to the shoulder at *q*, at the front side of the annulus, adapts the annulus for a front cap or plate to be hinged to or snapped upon the annulus, hinging being preferable, the front bezel-ring being attached to the riser K at the front of the annulus.

In most of the figures both risers K L are shown as constructed for the parts which are to be attached to them to be screwed upon them, notably Figs. 1 to 6, both inclusive, and Figs. 8, 9 and 14, while in Figs. 7, 10, and 11 the back riser is adapted for the part to be attached to it to be screwed upon it, and front riser for the part to be attached to it to be snapped over it, and in Figs. 12 and 13 both risers are adapted for the parts to be attached to them to be snapped over them; or in lieu thereof they may be hinged.

The movement-ring may be made in two or more parts screwed together, and if so made and secured their screw-threads, as also the screw-thread by which the back cap or plate or front bezel or other part of the case is attached to the movement-ring, should run in the opposite direction, which, obviously, would prevent the possibility of an accidental separation of the movement-ring and annulus as the said back cap or said bezel or other part is being removed.

The risers K L may be secured in place in other ways than by screwing them upon the ring or by fastening them with a screw or rivet to the annulus—as, for instance, by hinge, snap, or in any other of the common or suitable ways proper in making watch-cases or other like articles. Again, the risers may be fastened in place by screws or rivets, or by solder or other means in addition to the particular construction of them and of the other parts of the case.

The risers, if attached to the case by solder or other equivalent way, obviously become part of or in one piece, as it were, with the part of the case to which they are attached—that is, substantially so—and consequently in this description all such portions of it speaking of a riser being made in one piece with another part of the case are used in their broadest sense, meaning to include the risers when made separate from the ring, but permanently attached thereto by solder or otherwise, as above indicated.

A watch-case of the present improved construction can be most economically made, as it then would require but very little precious metal, and that for the central shell or annulus only, which can be a mere shell, cheaper or baser metals—such as albata, nickel, brass, or other kind—being used for the movement-ring and the construction of risers described.

The attachment of the central shell or annulus and movement-ring can be made the more secure, if desired, by passing the screws which are to fasten the case-springs in the chamber of the annulus through either one or both risers and the annulus.

Cases of the herein-described construction may be made very heavy, and at the same time use but a small proportion of precious metal.

It is preferable to attach the several parts of the watch-case together, or at least all such parts as do not require to be opened for the ordinary daily use of the watch, by screwing them into place, for the reason that the joints can be thus made tighter and closer, and more capable of preventing the passage of dust, air, or moisture to the movement.

Having thus described my invention, what I claim, and desire to secure by Letters Patent, is—

1. In a watch-case, a riser or risers adapted for the attachment thereto of parts of the case—such as the front or back cap or plate or bezel-ring and its crystal—and made independent of or separate from all of the other parts of and attached to the case, substantially as described.

2. In a watch-case, a riser or risers adapted for the attachment thereto of parts of the case—such as the front or back cap or plate or bezel-ring and its crystal—and made independent of or separate from all of the other parts and attached to the case, in combination with devices adapted to connect the parts together and prevent their rotation, substantially as described.

3. In a watch-case, a riser or risers adapted for the attachment thereto of parts of the case—such as the front and back cap or plate or bezel-ring and its crystal—and constructed to project from and to overlap the side of the central shell, substantially as described.

4. In a watch-case, a riser or risers adapted for the attachment thereto of parts of the case—such as the front or back cap or plate or bezel-ring and its crystal—and constructed to project and to overlap the side of the central shell, in combination with devices adapted to connect the parts together and prevent their rotation, substantially as described.

In testimony whereof I have hereunto set my hand in the presence of two subscribing witnesses.

DANIEL O'HARA.

Witnesses:
ALBERT W. BROWN,
WM. S. BELLOWS.